United States Patent
Swander et al.

(10) Patent No.: US 7,386,881 B2
(45) Date of Patent: Jun. 10, 2008

(54) METHOD FOR MAPPING SECURITY ASSOCIATIONS TO CLIENTS OPERATING BEHIND A NETWORK ADDRESS TRANSLATION DEVICE

(76) Inventors: Brian D. Swander, 10714 NE. 24th Ct., Bellevue, WA (US) 98004; William H. Dixon, 126 27th Ave. East, Seattle, WA (US) 98112; Abolade Gbadegesin, 1232 Lakeview Blvd. E, #6, Seattle, WA (US) 98102

( * ) Notice: Subject to any disclaimer, the term of this patent is extended or adjusted under 35 U.S.C. 154(b) by 889 days.

(21) Appl. No.: 10/348,594

(22) Filed: Jan. 21, 2003

(65) Prior Publication Data

US 2004/0143758 A1 Jul. 22, 2004

(51) Int. Cl.
*G06F 7/04* (2006.01)
*G06F 15/16* (2006.01)
*H04L 9/00* (2006.01)
*H04J 3/24* (2006.01)

(52) U.S. Cl. .................. 726/14; 726/3; 726/11; 726/12; 713/151; 713/153; 709/201; 709/225; 709/229; 370/392; 370/475

(58) Field of Classification Search .............. 726/3, 726/11–14, 26; 713/151, 153, 168; 709/201, 709/225, 229; 370/401, 475, 392
See application file for complete search history.

(56) References Cited

U.S. PATENT DOCUMENTS

| 6,457,061 | B1 * | 9/2002 | Bal et al. ............. 709/245 |
| 6,563,824 | B1 * | 5/2003 | Bhatia et al. ......... 370/392 |
| 6,795,917 | B1 * | 9/2004 | Ylonen ............... 713/160 |
| RE38,902 | E * | 11/2005 | Srisuresh et al. ...... 709/245 |
| 7,032,242 | B1 * | 4/2006 | Grabelsky et al. ..... 726/11 |
| 2004/0088537 | A1 | 5/2004 | Swander et al. |
| 2004/0133798 | A1 | 7/2004 | Swander |

FOREIGN PATENT DOCUMENTS

WO   WO 00/78008 A1   12/2000

OTHER PUBLICATIONS

IP Security Protocol Working Group (IPSEC) Internet Draft, Category: Standards track, Expires: Jun. 2003—UDP Encapsulation of IPsec Packets draft-ietf-ipsec-udp-encaps-05.txt, Dec. 2002, 10 pp.

(Continued)

*Primary Examiner*—MinhDieu Nguyen
(74) *Attorney, Agent, or Firm*—Wolf, Greenfield & Sacks, P.C.

(57) ABSTRACT

A method and system for mapping security parameters to a plurality of network sessions is provided. A responding computer maps the security parameters to the combination of packet parameters and a mapped port value used in each of the plurality of sessions. The packet parameters includes IP source and destination addresses, application source and destination ports and protocol type. The mapped port value is assigned by the responding computer to maintain a unique mapping between each security association and each network session.

10 Claims, 3 Drawing Sheets

OTHER PUBLICATIONS

Network Working Group, Request for Comments: 2406, Obsoletes: 1827, Category: Standards Track—IP Encapsulating Security Payload (ESP), Nov. 1998, 20 pp.

IPSec Working Group, Internet-Draft, Category: Informational, <draft-ietf-ipsec-nat-reqts-02.txt>, Aug. 18, 2002—IPsec-NAT Compatibility Requirements, 15 pp.

ipSEC Express—SSH IPSEC Express, White Paper, Version 2.0, Mar. 1999, 23 pp.

Network Working Group, Request for Comments: 2401, Obsoletes: 1825, Category: Standards Track—Security Architecture for the Internet Protocol, 58 pp.

IPSEC Working Group, Internet-Draft, draft-ieft-ipsec-ike-01.txt: The Internet Key Exchange (IKE), <draft-ietf-ipsec-ike-01.txt>, 36 pp.

Network Working Group, Request for Comments: 2663, Category: Informational, IP Network Address Translator (NAT) Terminology and Considerations, Aug. 1999, 27 pp.

* cited by examiner

METHOD FOR MAPPING SECURITY ASSOCIATIONS TO CLIENTS OPERATING BEHIND A NETWORK ADDRESS TRANSLATION DEVICE

TECHNICAL FIELD

This invention relates generally to security protocols and, more particularly, relates to a method and system that allows a network device to maintain unique mappings for security associations in network environments that use a network address translation (NAT) device.

BACKGROUND OF THE INVENTION

The popularity of the Internet and other private and public networks has resulted in increasing reliance on electronic transmission of data for both business and personal reasons. In many instances the data transmitted is of a personal or confidential nature. A user may provide credit card or other account information over the network to purchase goods or services. Sensitive and confidential business communications, emails, and documents are also transmitted over networks. It is necessary to provide security measures that protect such data as it is routed over the networks.

A popular protocol for electronically transmitting data is the Internet Protocol (IP). However, IP provides little security as the data within IP packets is not encrypted and may be accessed, viewed, and even altered by an eavesdropper. Thus, IP does not protect the confidentiality or authenticity of the data. These shortcomings have been addressed by the Internet Engineering Task Force (IETF), which developed a set of extensions to IP referred to as the Internet Protocol Security (IPSec) suite. The IPSec suite includes protocols such as encapsulating security protocol (ESP), and key management and exchange protocol (IKE).

The ESP protocol, documented mainly in IETF Request for Comments (RFC) 2406, is an authenticating and encrypting protocol that uses cryptographic mechanisms to provide integrity, source authentication, and confidentiality of data. A first network device, referred to as an initiator, and a second network device, referred to as a responder, transmit IP packets according to the ESP protocol to exchange data in a secure manner. According to the ESP protocol, some information in the ESP packet is encrypted, such as underlying payload data and a transport layer header, e.g. Transport Control Protocol (TCP) header or User Datagram Protocol (UDP) header.

The IKE protocol, documented mainly in IETF RFC 2409, provides a method for the initiator and responder to negotiate security settings used with the ESP IPSec format. The negotiated security settings form one or more data structures, called a security association (SA), which defines parameters such as the encryption algorithm, keys, and the lifetime of keys, used by ESP to protect the contents of the IP packet. Because ESP requires one or more established SAs, an IKE negotiation is executed before the ESP protocol is used. Once the IKE negotiation is complete, a secure session is formed between the initiator and responder.

Typically, the responder maintains a plurality of SAs per secure session. A first SA is for inbound traffic, i.e. packets sent from the initiator to the responder, and a second SA is for outbound traffic, i.e. packets sent from the responder to the initiator. The first and second SAs are referred to as IPSec SAs. The inbound traffic SA instructs the responder how to process incoming IPSec packets received from the initiator and the outbound traffic SA instructs the responder how to generate outbound IPSec packets destined for the initiator. Each IPSec SA has a corresponding selector used to define what type of packets should be encapsulated using the parameters of the IPSec SA. The initiator likewise maintains reciprocal inbound and outbound IPSec SAs for the secure connection. Other SAs may exist such as an IKE SA that is used as part of the IKE negotiation process.

The responder is capable of maintaining multiple secure sessions with one or more initiators in which case the responder maintains a set of inbound and outbound SAs for each session. The responder must have a mechanism to select the proper inbound and outbound SA when receiving and transmitting ESP packets. To that end, inbound packets include unique identification, including a security parameter index (SPI), which in conjunction with other data allows the responder to identify and apply the proper inbound SA for received packets.

When the responder transmits an IP packet to a network device, it first determines, based on IPSec policy selectors, whether the packet is subject to IPSec processing. If the packet is subject to IPSec, the responder identifies the proper outbound SA based on packet parameters, including protocol type, source and destination IP address, and source and destination application ports. Because the responder maintains multiple secure connections, each of which may have its own associated outbound SA, it is important that the combination of these parameters be unique for each secure connection.

Recent proposals suggest methods for implementing the IPSec protocol suite in network environments using a network address translation device (NAT). An example of such a network includes a NAT connected to a plurality of network devices on an internal network as an interface between the internal network and an external network. Each network device has a private source IP address that is valid on the internal network but not valid on the external network. When a first network device sends an IP packet destined for the external network, the NAT intercepts the packet and replaces the private source IP address with an IP address valid on the external network, such as a public IP address assigned to the NAT. The NAT performs the same process for each network device, and in each case uses the same source public IP address. This process, known as address translation, allows multiple initiators behind the NAT to communicate over the external network with a single source IP address.

The NAT may also perform port translation (NAPT), i.e. changes an application source port in the transport layer header, when necessary, to ensure that each network device behind the NAT sends packets with a unique combination if IP addresses and ports over the external network. The unique combination provides the NAT with a mechanism to route response IP packets sent from devices on the external network to the proper network device on the internal network. NAPT allows multiple computers behind a NAT to use a single address to communicate with the same network device, i.e. same destination IP address, using typical well-known UDP and TCP ports.

As previously described, the transport layer header in ESP packets is encrypted. Thus, the application source port in the header is opaque to the NAT. The NAT cannot read and modify the source port preventing the port translation function of the NAT.

One known method that permits NATs to perform port translation on ESP packets is called UDP encapsulation. According to this method, the encrypted portion of the ESP packet is encapsulated into an unencrypted UDP packet. The unencrypted UDP packet includes a UDP header with unencrypted source and destination ports. For implementation reasons, such as taking advantage of mappings created during IKE negotiations, the source and destination port values in the unencrypted UDP header are typically selected as port 500 or 4500, the Internet assigned numbers authority (IANA) designated ports for IKE negotiations. The NAT can access and modify the source port in the added unencrypted UDP header, thereby permitting the NAT to perform both address and port translation on the ESP packets.

Although UDP encapsulation facilitates NAT traversal for ESP packets, it does not offer a complete solution for processing of the ESP packets at the responder. The unencrypted UDP ports do not correlate to the encrypted application ports. When two or more initiators behind a NAT maintain secure sessions with the same responder, the source and destination IP addresses will likely be the same because of the address translation provided by the NAT. Moreover, there is no guarantee that the source and destination application ports will be unique since the NAT uses the unencrypted UDP ports for the port translation and not the encrypted application ports. Thus, there is chance that two outbound SAs at the responder will be mapped to the same combination of protocol type, IP addresses and application ports. When this occurs, the responder cannot determine which of the two or more outbound SAs should be applied to a given outbound packet. Examples of scenarios that require a solution for this problem include configurations where several employees of the same company (behind NAT) use IPSec Virtual Private Network (VPN) clients to their VPN server and configurations where conference participants (behind the same NAT) use IPSec protected TCP or UDP based connections to the same Internet server.

One solution is for the responder to internally assign a unique source IP address to one of the initiators when a session conflict is detected. Although this solution may provide unique mappings for outbound SAs, there is danger that the assigned unique source IP address will conflict with the actual IP address of some other network device, or that the original source Internet address is meaningful to applications, functions in layers above IP, or other IPSec policy enforcement.

From the foregoing, it is evident that a solution is needed to allow a responding computer to maintain unique mappings for outbound security associations used in network environments that employ a NAT.

SUMMARY OF THE INVENTION

The invention uses a port translating shim at a responding computer to track secure sessions and facilitate mapping outbound security associations to multiple initiating computers operating behind a NAT. It can also be used for more general cases of IPSec protected UDP and TCP communication where NAT or NAPT is used between the initiating computer and responding computer.

Each packet received during a secure session has parameters including source and destination IP address, source and destination application ports and protocol type. The shim creates a mapped port value such that the combination of the parameters and the mapped port are unique for the secure session. The shim also maps the security association for the secure session to the combination of parameters and mapped port. The shim modifies the packet to include the mapped port in place of the application source port and sends the packet to upper protocol layers.

When the responder sends a response packet to one of the initiating computers, the shim changes the mapped port back to the application source port value and sends the packet along with identification of the proper security association to a security protocol layer where the packet is processed according to the security association. The invention permits the responder to maintain outbound security association mappings without creating possible IP address conflicts.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
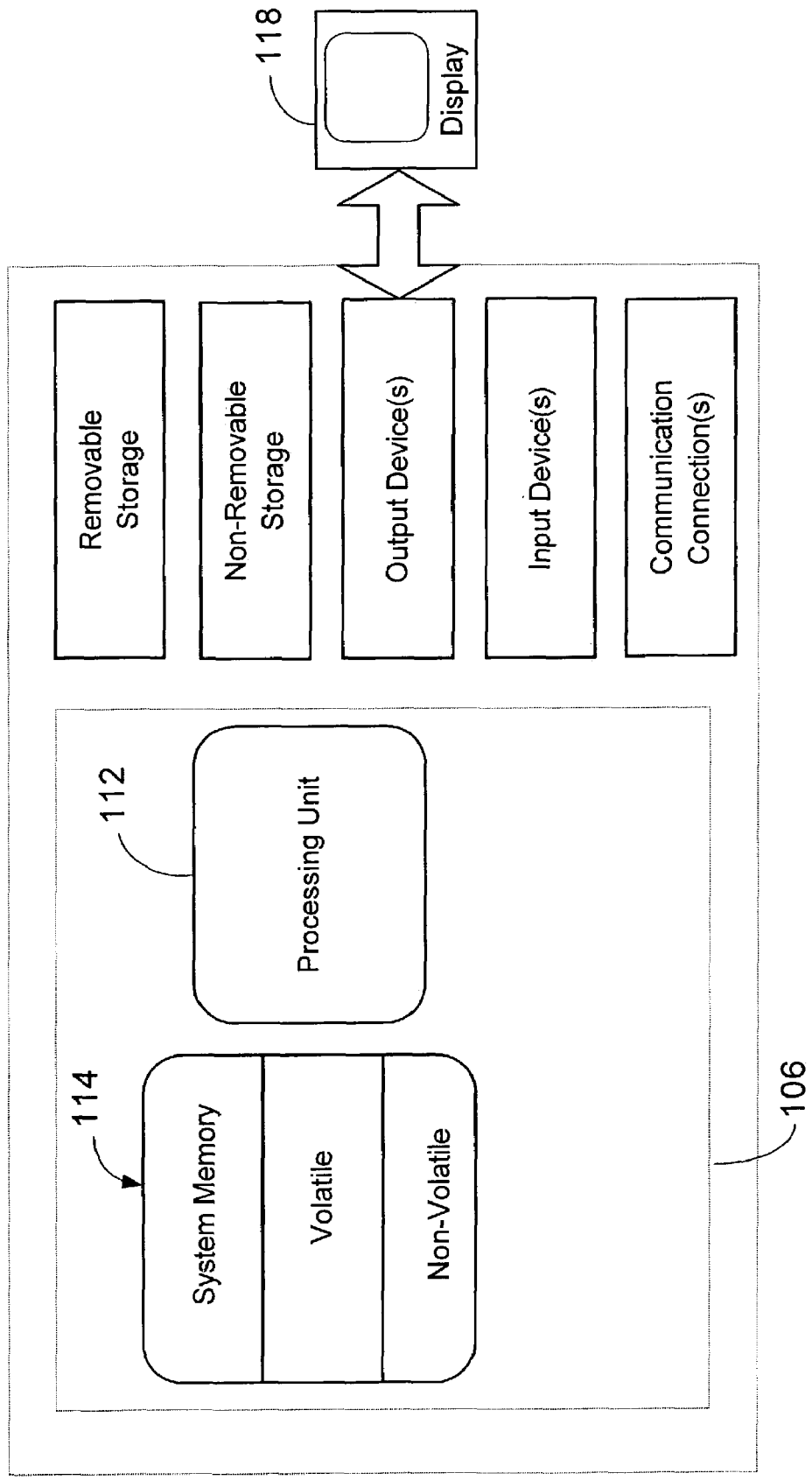
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The present invention may be implemented by programming code modules that are executed by a computer. Generally, program modules include routines, objects, components, data structures and the like that perform particular tasks or implement particular abstract data types. The terms "program" and "module" as used herein may connote a single program module or multiple program modules acting in concert. The invention may be implemented on a variety of types of computers, including personal computers (PCs), telephones, hand-held devices, multi-processor systems, microprocessor-based programmable consumer electronics, network PCs, minicomputers, mainframe computers and the like. The invention may also be employed in thin clients and distributed computing environments, where tasks are performed by remote processing devices that are linked through a communications network. In a distributed computing environment, modules may be located in both local and remote memory storage devices.

Referring to FIG. 1, an example of a basic configuration for a computer 100 on which a network computer in the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 1 by line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

Figure 2:
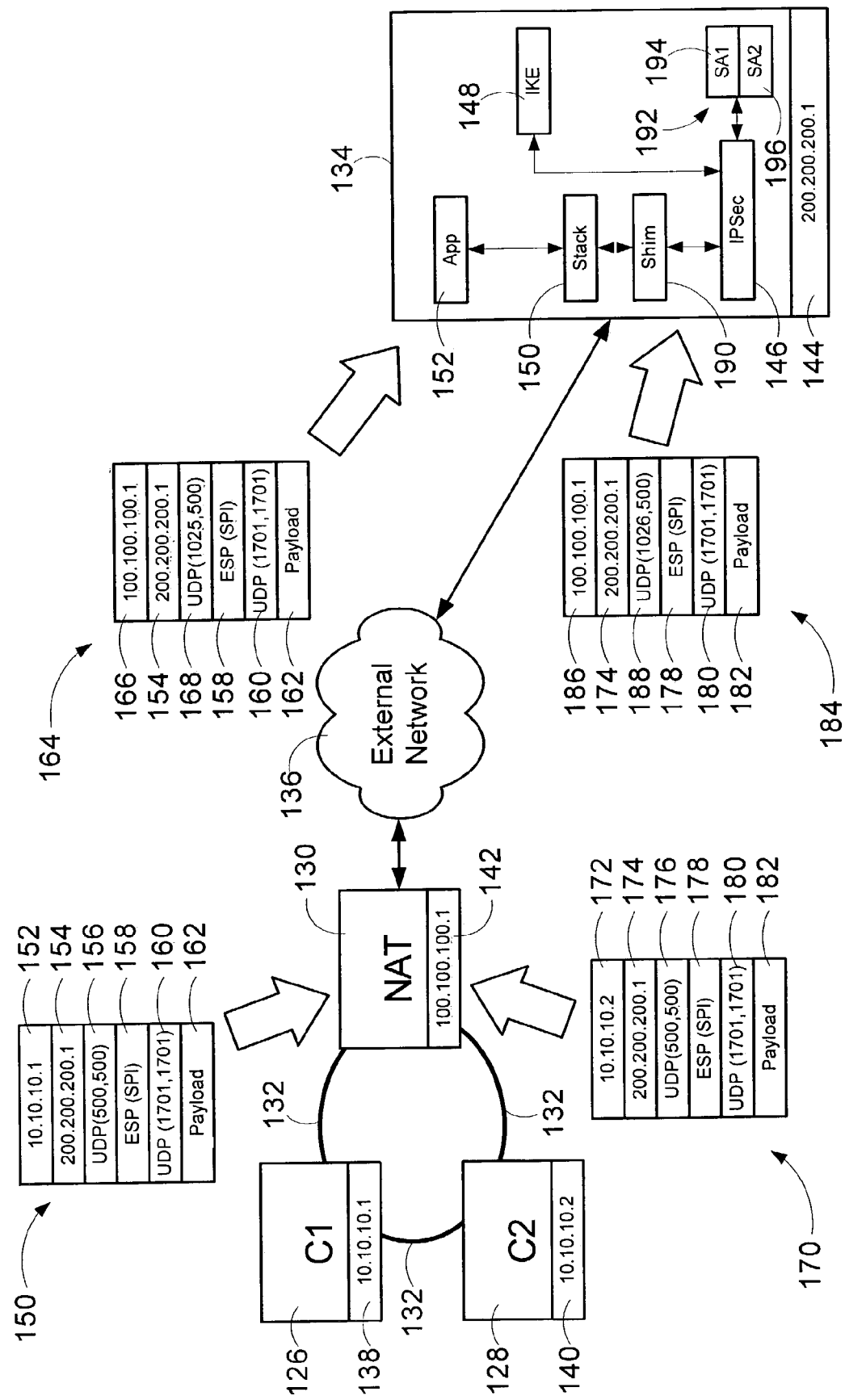
FIG. 2 is a block diagram generally illustrating an exemplary operating environment employing the present invention.

FIG. 2 illustrates an exemplary operating arrangement embodying the present invention. The present invention is directed to a way for a responding computer to select an outbound security association when sending IP packets according to a security protocol in a network environment that includes at least one network translation device (NAT). For illustration purposes, the invention will be described below in connection with an embodiment that implements an IPSec protocol suite and, in particular, an encapsulating security protocol (ESP). It will be appreciated, however, that the system and method can also be used with other network security protocols for solving similar problems.

The arrangement includes a plurality of client computers, referred to as initiators 126, 128, and a NAT 130 connected to an internal network 132. The environment also includes an external network 136 such as the Internet. a network device, referred to as a responder 134, and the NAT 130 communicate over the external network 136. The NAT 130 provides an interface between the initiators 126, 128 connected to the internal network 132 and the responder 134 connected to the external network 136. In the arrangement shown in FIG. 2, the initiators 126, 128, initiate communications with other network devices, such as the responder 134 located on the external network.

The responder 134 and each initiator 126, 128 are implemented as any suitable computing device such as personal computers, handheld devices, printers, switches, routers, bridges, repeaters or the like. It will also be understood that, although a limited number of devices are shown connected to the internal network 132 and the external network 136, each network may be connected to many network devices. Moreover, the internal network 132 and the external network 136 are implemented as any suitable network type such as Local Area Networks (LANs), Wide Area Networks (WANs), an intranet, the Internet, or any combination thereof.

The NAT 130 may be a dedicated device or may itself be an initiator. For the purpose of illustrating the invention, the NAT 130 is shown as part of the internal network 132. The invention may be applied to other network environments with different NAT implementations. For example, the responder 134 may operate behind a NAT.

Each initiator 126, 128 has a private IP address. For example, the private IP address 138 for the initiator 126 is 10.10.10.1 and the private IP address 140 for the initiator 128 is 10.10.10.2. The private IP addresses form valid source and destination addresses for use in IP packets transmitted within the internal network 132. The use of source and destination IP addresses to route packets is well known and need not be described in detail herein. However, in the embodiment shown, it will be understood that the private IP addresses of the initiators 126, 128 are not valid, i.e. not assigned, for use as source and destination IP addresses on the external network 136.

The NAT 130 and the responder 134 each has a public IP address, labeled 142 and 144 respectively. Unlike the private IP addresses 138, 140 of the initiating computers, the pubic IP addresses 150, 152 are valid for use as source and destination IP addresses on the external network 136.

The NAT 130 forms an interface between the internal network 132 and the external network 136 and permits the initiators 126, 128 to send IP packets to devices such as the responder 134 located on the external network 136. The use of a NAT is well known and need not be described in detail herein. However, for the purpose of understanding the present invention, it will be understood that the initiators 126, 128 send IP packets destined for devices on the external network 136, such as IP packets destined for the responder 134. The packets are sent onto the internal network 132 and include an IP header with source and destination IP addresses and a transport layer header such as a User Datagram Protocol (UDP) header with source and destination application port values. The source IP addresses are the private IP addresses 138, 140 of the initiators, which as previously described, are not valid on the external network 136.

The NAT 130 receives each packet and, in a process known as address translation, changes the source IP address to a valid source IP address for use on the external network 136, such as the IP address 142 of the NAT 130. The NAT may also perform port translation (NAPT) by changing the application source port value in packets to ensure that each initiator 126, 128 sends packets with a unique combination of application source port value and source IP addresses. The NAT 130 then transmits the modified packets onto the external network 136.

The address translation performed by the NAT 130 allows both the initiators 126, 128 to send packets onto the external network 136 using a single IP address that is valid on the external network 136. The port translation performed by the NAT 130 provides a means for network devices to distinguish packets sent by the initiator 126 from those sent by the initiator 128.

To protect the authenticity and confidentiality of data exchanged between the initiators 126, 128 and the responder 134, the initiators 126, 128 send packets to the responder 134 according to a security protocol such as the IPSec protocol suite. The IPSec protocol suite includes an encapsulating security protocol (ESP) which is an authenticating and encrypting protocol that utilizes cryptographic mechanisms to protect the authenticity and confidentiality of data. The IPSec protocol suite also includes a key management and exchange protocol (IKE) that provides a method for the initiators and the responder to negotiate security settings used by ESP to protect the contents of the IP packet. The negotiated security settings are stored in one or more data structures called a security association (SA) which includes parameters such as an authentication algorithm, encryption algorithm, keys, and lifetime of keys, used by ESP to protect the contents of the IP packet.

The responder 134 includes an IPSec process 146 and an IKE process 148. The IKE process 148 is responsible for conducting IKE negotiations and establishing SAs, labeled 192, with the initiators 126, 128. The IPSec process 146 is responsible for processing ESP packets, e.g. decrypting incoming ESP packets and encrypting outgoing ESP packets using the parameters in the negotiated SAs 192. The IKE process 148 and IPSec 146 are implemented in any suitable manner. In the example shown in FIG. 2, the IKE process 148 and IPSec process 146 execute within an operating system of the responder 134. Initiators 126, 128 likewise include reciprocal IPSec and IKE processes for implementing the IPSec protocol, which for simplicity are not shown.

Each occurrence of a successful IKE negotiation between one of the initiators 126, 128 and the responder 134 results in a secure session. The responder 134 is capable of maintaining multiple secure sessions with the initiators 126, 128. Typically, the responder 134 maintains a plurality SAs for each session. A first SA is for inbound traffic, i.e. packets received from the initiator. The inbound SA instructs the IPSec process 146 how to process, e.g. decrypt, incoming packets. A second SA is for outbound traffic, i.e. packets sent from the responder to the initiator. The outbound SA instructs the IPSec process 146 how to transform, e.g. encrypt, the outbound packet. The inbound and outbound SA for a given session are collectively called a bundle. In the example shown, SA1, labeled 194, represents the bundle of SAs for a first session with initiator 126. SA2, labeled 196, represents the bundle of SAs for a second session with initiator 128. The responder may maintain other SAs, such as an IKE SA, which need not be described for the purpose of understanding the present invention.

The ESP packets received from initiators 126, 128 at the responder 134 each include a value called a security parameter index (SPI). According to the ESP protocol, the SPI value is, along with other data, mapped to the proper inbound SA. Thus, for example, when the responder 134 receives an ESP packet from the initiator 126, it reads the SPI value and is able to identify SA1, labeled 194. Based on the data in the SA, the IPSec process 146 is able to decrypt the packet and route it to the appropriate processes within the responder 134.

When the responder 134 sends a response packet to initiator 126, it must likewise select the proper outbound SA so that the IPSec process 146 can apply the proper parameters, such as the encryption algorithm, to the outbound packet. According to the IPSec protocol, the responder 134 uses a combination of packet parameters to identify the proper SA for an outbound packet including protocol type, source and destination IP address, and source and destination application port. It is important that these parameters be unique for each connection so that the responder 134 can select the proper outbound SA for the response packet.

The packet parameters, however, may not be unique for two or more sessions in network environments using one or more NATs thereby resulting in conflicting sessions. An example of conflicting sessions is illustrated by the following example. The initiator 126 sends a first ESP packet 150 destined for the responder 134 onto the local network 132. As shown, the packet includes the private IP address 138 of the initiator 126 as the source IP address in field 152. The destination IP address in field 154 is that of the responder 134, namely 200.200.200.1. The packet 150 also includes an ESP header, labeled 158, which conforms to the ESP protocol and includes the security parameter index (SPI), which is a unique value assigned to the session between the initiator 126 and the responder 134.

A field 160 includes a transport layer header with application source and destination ports. The nomenclature "UDP (1701,1701)" represents a user datagram protocol (UDP) layer header with source and destination application ports of 1701, where the first value represents the source port and the second value represents the destination port. As used herein, the source port identifies a process at the initiator 126 and the destination port identifies a process at the responder 134. Port 1701 is designated by the Internet assigned numbers authority (IANA) for a process known as layer two tunneling protocol (L2TP). Field 162 includes the data to be transmitted between the initiator 128 and the responder 134. Thus, the data 162 initiates from an L2TP process at the initiator 126 and is destined for an L2TP process at the responder 134.

It will be understood that the L2TP process identified by port 1701 is used for exemplary purposes only. The present invention may be used in connection with any process or application at the initiators and responders.

According to the ESP protocol, fields 160 and 162 are encrypted. Thus, the application ports in the UDP header field 160 are unavailable for port translation by the NAT 130. To facilitate NAT traversal and port translation, the packet 150 also includes an added UDP header 156 with source and destination ports in accordance with a method known as UDP encapsulation. Any suitable values may be used for the source and destination ports. In the example, the port is selected as 500 to take advantage of mappings created during the IKE negotiation as port 500 is the IANA assigned port for IKE traffic. The added UDP header 156 is unencrypted and may be read and modified by the NAT 130 thereby providing a mechanism for traversing the NAT 130 with ESP packets. As used herein, the ports in the added unencrypted UDP header are called IKE ports or UDP-ESP encapsulation ports. It will be understood that in some implementations, the IKE source and destination ports are another value such as, for example, 4500.

A packet 164 illustrates the ESP packet sent from initiator 126 to the responder 134 following NAT address and port translation. As shown in field 166, the NAT 130 changes the source IP address from the private IP address of the initiator 126 to the public IP address of the NAT 130. The NAT 130 also modifies the source IKE port address of the inbound packet in the unencrypted UDP header from 500 to 1025 as shown in field 168. The remaining fields in the packet remain unchanged by the NAT 130.

A Packet 170 illustrates a second ESP packet sent from the other initiator 128 to the responder 134. The source IP address field 172 includes the IP address of the initiator 128 and destination IP address field 174 includes the IP address of the responder 134. The packet 170 also includes ESP header 178, UDP header 180, and payload data 182. The source and destination application ports are identified as 1701, again representing initiator and responder L2TP processes. As previously described for packet 150, fields 180 and 182 are encrypted according to the ESP protocol. The packet 170 includes added UDP header 176, which includes IKE source and destination ports 500 and is unencrypted according to the UDP encapsulation method.

A packet 184 illustrates the second ESP packet sent from the initiator 128 to the responder 134 following address and port translation by the NAT 130. As shown, the source IP address field 186 is modified to include the public IP address 142 of the NAT 130. The unencrypted UDP header field 188 is modified by the NAT 130 to include a source IKE port of 1026. Field 174, 178, 180, 182 remain changed by the NAT 130.

When the responder 134 receives the packets 164 and 184 it applies an inbound SA to process each packet. As previously described, the responder 134 uses the SPI from the ESP header to identify the proper inbound SA. For example, the responder 134 reads the SPI from the ESP header 158 in the packet 164 and determines that SA1 is the proper inbound SA. Likewise, the responder 134 reads the SPI from the ESP header 178 in the packet 184 and identifies SA2 as the proper SA.

According to known methods for processing IP packets, information in the packets 164, 184 is forwarded up protocol layers within the responder 134 until the data 162 reaches the appropriate application or process 152 in the responder 134. In the example, the destination process is an L2TP process. A response is then formulated by the L2TP process and a conventional IP packet is constructed by the stack 150. The IPSec process 146 then determines, based on IPSec policy selectors, that the response packets to initiators 126, 128 require IPSec processing.

For response packets, the SPI value is unknown to the responder 134 until the proper outbound SA is selected. As previously described, according to the ESP protocol, the responder 134 uses the combination of protocol type, and IP addresses and application port values to distinguish between the session with initiator 126 and the session with the initiator 128 and to select the proper outbound SA for a given packet. However as can be seen from the packet 164 (fields 166, 154, 160) and the packet 184 (fields 186, 174, 180), the IP addresses, application ports and protocol type are identical for both sessions with initiator 126 and 128. Thus, the responder 134 requires a mechanism to track the different sessions so that the proper outbound SA can be applied to outbound response packets.

In an embodiment of the invention, a shim 190 is used in conjunction with the IPSec process 146 to track the secure sessions in process. When the shim 190 identifies conflicting sessions, i.e. two or more sessions with the same combination of protocol type, IP addresses and port values of decapsulated UDP-ESP traffic, the shim 190 modifies application source ports, as necessary, to ensure that the responder 134 can select the proper outbound SA for each response packet. Because session conflicts occur as a result of the UDP-ESP encapsulation process, the shim 190 need not process non UDP-ESP encapsulated packets. Such packets can be handled by the responder 134 using conventional methods.

Figure 3:
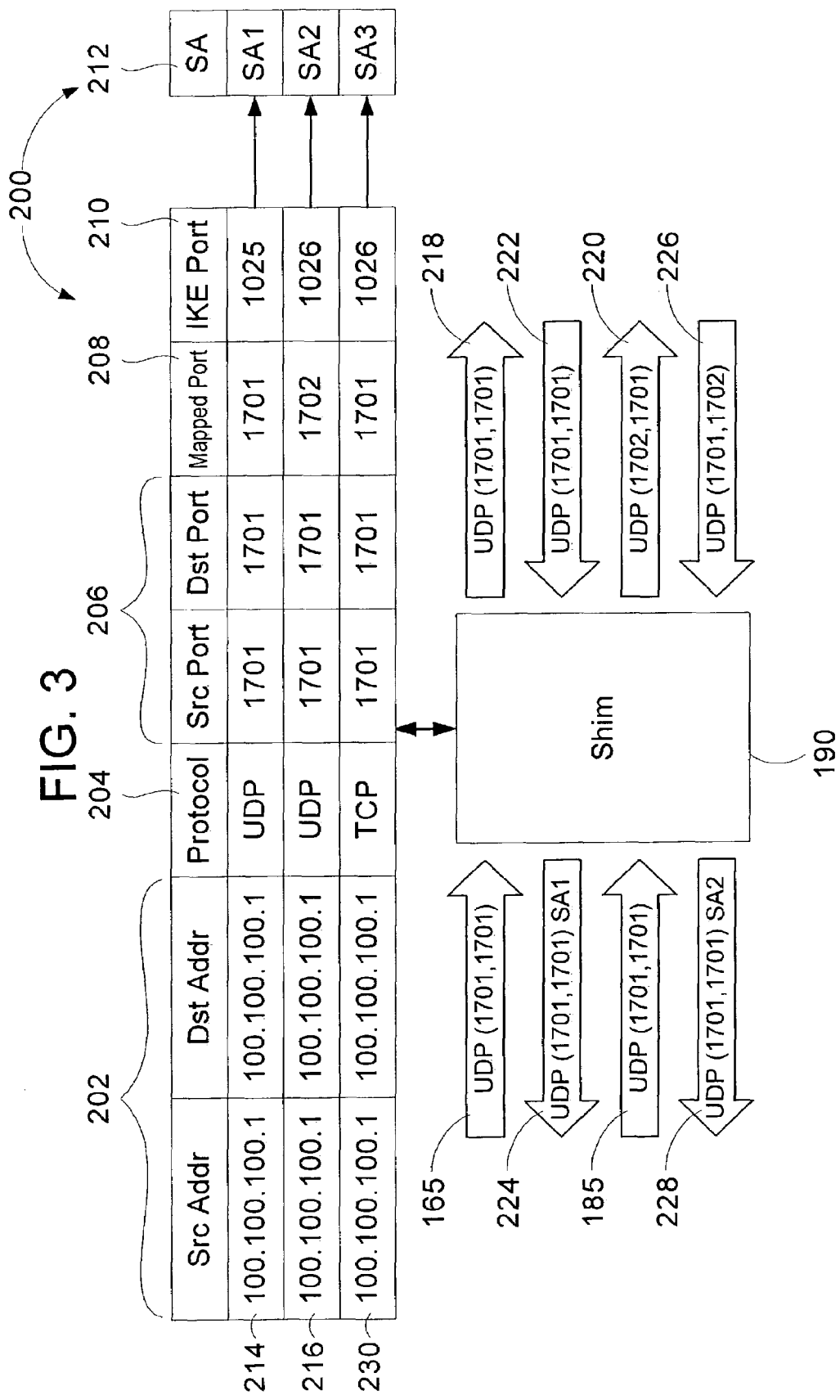
FIG. 3 is a block diagram generally illustrating an exemplary method used to implement the present invention.

FIG. 3 illustrates the method used by the shim 190 to track the sessions with the initiators 126 and 128 so that the proper outbound SA is selected for response packets sent from the responder 134 to the initiators 126, 128. Although the method is described as being implemented by the shim 190, the method may be implemented in whole or in part by other processes such as IPSec driver 146.

In the exemplary embodiment shown, packets 165 and 185 illustrate packets received from the initiators 126, 128 and forwarded to the shim 190 by the IPSec process 146. Packets 218 and 220 represent the received inbound packets after processing by the shim 190 as forwarded to upper protocol layers such as the stack 150 and eventually the destination process 152, such as the L2TP process. Packets 222 and 226 illustrate response packets generated by the destination process at the responder 134, which packets are destined for the initiators 126, 128. Packets 224 and 228 represent the response packets after processing by the shim 190. For illustration purposes, each of the packets is shown only with limited information such as source and destination port values.

A data structure 200 is used to track the sessions with the initiator 126, 128. The data structure 200 includes entries for each session, labeled 214, 216, 230. In the example, the entry 214 corresponds to the session with the initiator 126 and the entry 216 corresponds to the session with the initiator 128. For each session the shim 190 tracks packet parameters including the source and destination IP address, field 202, the application transport layer protocol type, 204, application source and destination ports 206 and IKE source port, 210. In an embodiment of the invention, the IKE source port 210 may be dynamically updated based on the last successfully authenticated inbound UDP-ESP encapsulated packet.

The shim 190 maintains mapped port values in the field 208. The mapped port value forms an additional parameter used to distinguish between the sessions with initiators 126, 128. When the shim 190 identifies conflicting sessions with the initiators 126, 128, as indicated by the same combination of IP addresses, application port values, and protocol type, the shim 190 ensures that the mapped port values for the two sessions are unique. When the inbound packet is forwarded to upper protocol layers by the shim 190, the application source port is replaced with the mapped source port value. The shim 190 also modifies checksums within the packet header and other information as required based on the modified port values The shim 190 also maps the combination of protocol type, IP addresses, application destination port value, as referenced to the inbound packet, and mapped port to the proper security association as shown in field 212. When the shim 190 receives a response packet from an application, such as the L2TP process at the responder, the shim 190 modifies the packet by changing the mapped port value back to the application source port value. It will be understood that the shim 190 also modifies checksums within the packet header and other information as required based on the modified port values. The shim 190 then forwards the packet to the IPSec process 146 along with an indication of which outbound SA to use.

As a specific example, the shim 190 receives the packet 165 sent from initiator 126 following decryption by the IPSec process 146. The packet parameters including the source and destination IP address, protocol type and application source and destination ports are stored as entry 214. Prior to receiving the packet 184 from the IPSec process 146, this combination of parameters is unique to the session with initiator 126. Accordingly, the shim 190 creates a mapped port value 208 that is the same as the application source port, namely 1701.

The shim 190 forwards the packet 218 to upper protocol layers such as stack 150 with the source and destination port values remaining 1701. It will be understood that as the packet is sent to upper protocol layers, certain information such as the IP header fields are removed according to known methods. Moreover, although the shim tracks the IKE source port (UDP-ESP encapsulation port), that information does not form part of standard IP and thus it is not included in the packet sent to the upper protocol layers. Although not shown, the shim 190 also tracks the IKE destination port as included in the UDP-ESP encapsulation port of the inbound packet.

For the purpose of the present invention, the IKE source port field 210 is used by the shim 190 when receiving inbound packets from the IPSec process 146 to distinguish between sessions with initiator 126 and 128. As shown, the session with initiator 126 uses IKE source port 1025 while the session with initiator 128 uses IKE source port 1026. The IKE source port is not available to map outbound packets to the proper outbound SA. For outbound packets, the shim 190 uses the combination of mapped port 208, which in the outbound packet is the destination port value, the original destination port 206, which in the outbound packet is now the source port value, source and destination IP addresses 202 and protocol 204 to identify the proper outbound SA.

The IPSec process 146 subsequently decrypts and sends the packet 185 to the shim 190. As illustrated by entry 216, the combination of IP addresses 202, protocol type 204 and ports 206 is identical to that of entry 214. Thus, a session conflict exists between the session with initiator 126 and the initiator 128. As a result, the shim 190 creates a mapped port different from the application source port value. In the example, the shim creates a mapped source port value of 1702 as shown in field 208. When the shim 190 sends the packet to the upper protocol layers, such as stack 150, it sends modified packet 220 using the mapped port value of 1702 as shown by packet 220. The shim 190 also modifies checksum and other data within the packet 220 to maintain packet validity in view of the modified port values.

The packets 222 and 226 represent response packets destined for the initiators 126, 128 respectively. The shim 190 receives the response packet 222 from the upper protocol layers. It will be understood that, in the response packets, the source port value is now the port value for the responder 134 and the destination port value is now the port value for the initiator. For example, packet 226 includes a UDP header with ports "1701,1702" where the first value represents initiator port value and the second value represents the mapped port 208 value. The shim 190 performs three functions for response packets destined for the initiators. First, it changes the mapped port value back to its original value, i.e. the application source port value. Second, the shim 190 determines which outbound SA to use. Third, the shim recalculates the checksum using the new port values for the application packet before IPSec processing. The NAT shim then forwards the packet and outbound SA identification to the IPSec process for further processing.

In the case of packet 222, the shim 190 determines the mapped port value is the same as the application source port. Thus, the port values in the packet remains the same value. The shim 190 forwards packet 224 with the application port addresses and also identifies SA1 as the proper outbound SA.

In the case of response packet 226, the mapped port value is different from the application source port. Accordingly, the shim 190 changes the mapped port value from 1702 back to 1701, the original application source port and recalculates the UDP checksum. The shim 190 forwards the packet 228 to the IPSec process and identifies SA2 as the proper outbound SA.

It should be understood that the mapped port value only needs to be different from the application source port where two conflicting sessions are detected. For example, a second session with the initiator 128 is illustrated by an entry 230 in the data structure 200. As shown, the combination of IP address and application port values are the same as for the session with initiator 126, labeled 214. However, the protocol type 204 is TCP rather than UDP. Thus, the shim 190 can create a mapped port value 208 that is the same as the application port, namely 1701. This condition would happen when the initiator has established two IPSec SAs, SA2 for UDP traffic, and SA3 for TCP traffic, such that there is a unique SPI for each IPSec SA.

As illustrated by the example, the shim 190 permits the IPSec process to select the proper outbound SA where two sessions have conflicting parameters of IP and port address and protocol type.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Also, although the invention has been described in conjunction with the ESP protocol, it will be understood that the invention may be modified to work with other security protocols such as authentication header (AH) protocol and like. Therefore, the invention as described herein contemplates all such embodiments as may come within the scope of the following claims and equivalents thereof.

We claim:

1. A method of tracking a plurality of security protocol sessions between at least a first and second initiator and a responder, whereby the responder maintains a plurality of security associations having security parameters, one of the plurality of security associations corresponding to each of the security protocol sessions, comprising:

receiving a first packet from the first initiator of a first session, the first packet including first parameters comprising first source and destination IP addresses, first source and destination application ports, and a first protocol type, and creating a first mapped port;

associating the first parameters and the first mapped port to a first security association;

receiving a second packet from the second initiator of a second session, the second packet including second parameters comprising second source and destination IP addresses, second source and destination application ports, and a second protocol type; and if the first source IP address is identical to the second source IP address, the first destination IP address is identical to the second destination IP address, the first application port is identical to the second application port, the first destination port is identical to the second destination port, and the first protocol type is identical to the second protocol type, creating a second mapped port wherein the second mapped port is distinct from the first mapped port; and associating the second packet parameters and the second mapped port to a second security association.

2. The method of claim 1, further comprising: determining whether the first packet parameters are identical to the second packet parameters.

3. The method of claim 1, further comprising: modifying the second packet parameters by replacing the second source application port with the second mapped port and sending the second packet to an upper protocol layer.

4. The method of claim 1, wherein the first and second initiator are interfaced to the responder through a network address translation device.

5. The method of claim 1, wherein the first and second packets are encapsulating security protocol packets.

6. A computer storage medium encoded with a computer program for tracking a plurality of security protocol sessions between at least a first and second initiator and a responder, whereby the responder maintains a plurality of security associations having security parameters, one of the plurality of security associations corresponding to each of the security protocol sessions, comprising:

receiving a first packet from the first initiator of a first session, the first packet including first parameters comprising first source and destination IP addresses, first source and destination application ports, and a first protocol type, and creating a first mapped port;

associating the first parameters and the first mapped port to a first security association;

receiving a second packet from the second initiator of a second session, the second packet including second parameters comprising second source and destination IP addresses, second source and destination application ports, and a second protocol type; and if the first source IP address is identical to the second source IP address, the first destination IP address is identical to the second destination IP address, the first application port is identical to the second application port, the first destination port is identical to the second destination port, and the first protocol type is identical to the second protocol type, creating a second mapped port wherein the second mapped port is distinct from the first mapped port; and associating the second packet parameters and the second mapped port to a second security association.

7. The computer storage medium of claim 6, further comprising: determining whether the first packet parameters are identical to the second packet parameters.

8. The computer storage medium of claim 6, further comprising: modifying the second packet parameters by replacing the second source application port with the second mapped port and sending the second packet to an upper protocol layer.

9. The computer storage medium of claim 6, wherein the first and second initiator are interfaced to the responder through a network address translation device.

10. The computer storage medium of claim 6, wherein the first and second packets are encapsulating security protocol packets.

* * * * *